May 21, 1935. J. W. DECKER Re. 19,572
STOCK QUOTATION PROJECTION MACHINE AND METHOD FOR FEEDING TAPE THERETHROUGH
Original Filed Jan. 25, 1928 3 Sheets-Sheet 1
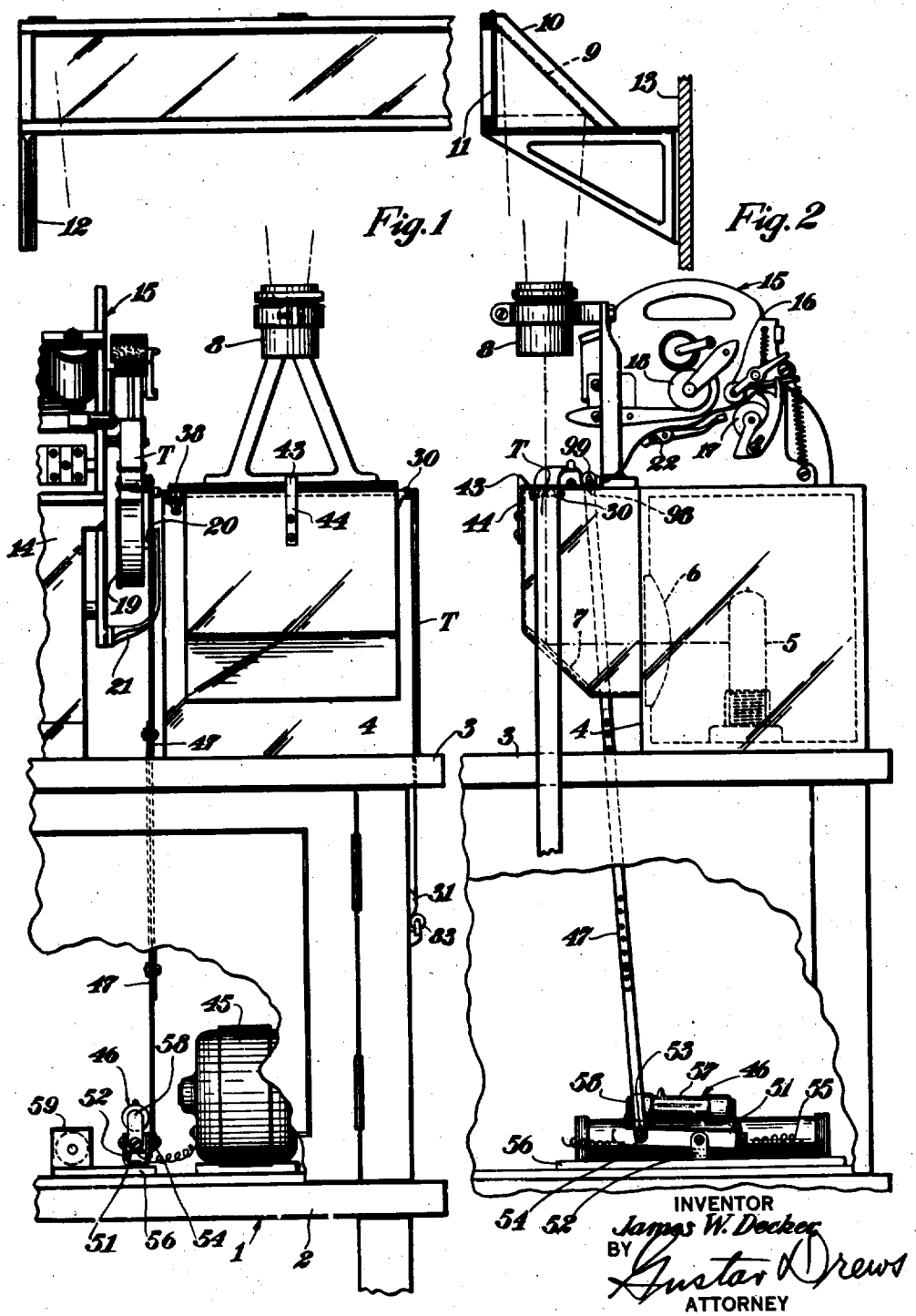

May 21, 1935. J. W. DECKER Re. 19,572

STOCK QUOTATION PROJECTION MACHINE AND METHOD FOR FEEDING TAPE THERETHROUGH

Original Filed Jan. 25, 1928 3 Sheets-Sheet 2

INVENTOR
James W. Decker
BY Gustav Drews
ATTORNEY

May 21, 1935. J. W. DECKER Re. 19,572

STOCK QUOTATION PROJECTION MACHINE AND METHOD FOR FEEDING TAPE THERETHROUGH

Original Filed Jan. 25, 1928 3 Sheets-Sheet 3

INVENTOR
James W. Decker,
BY
Gustav Drews
ATTORNEY

Reissued May 21, 1935 Re. 19,572

UNITED STATES PATENT OFFICE 19,572

STOCK QUOTATION PROJECTION MACHINE AND METHOD FOR FEEDING TAPE THERETHROUGH

James W. Decker, New York, N. Y.

Original No. 1,903,806, dated April 18, 1933, Serial No. 249,383, January 25, 1928. Renewed February 16, 1932. Application for reissue July 1, 1933, Serial No. 678,697

20 Claims. (Cl. 88—24)

This invention relates in general to projecting machines and more especially to machines for projecting news items such as stock quotations on ticker tape and the like and the method for feeding tape through such projecting machines.

Among the objects of the present invention it is aimed to provide an improved construction which makes possible the use of a single mirror for projecting the images on a vertical screen above the projecting machine, in which construction the ticker tape is free to be inspected as it leaves the ticker machine and before it passes to the projecting machine.

Among the objects of the present invention it is also aimed to provide an improved mechanism for dissipating the vibrations transmitted to the tape by the ticker so that the tape may pass the projecting lens in a comparatively uniform even feed.

The present invention also aims to provide an improved construction for controlling the operation of the motor for driving the tape drawing or pulling means contemplating an electric make and break which is spaced a considerable distance from the tape, which has no open spark, and which will produce a dwell both before making contact and before breaking contact in order to protect the tape from the jar incident to the sudden stopping and starting of the movement of the tape.

The present invention also aims to provide an improved mechanism for controlling the rewind action of the tape after it is discharged from the projecting mechanism whereby the rewind reel will be effectively anchored against actuation as soon as the ticker has stopped sufficiently long to prevent the rewind reel to take up the slack in the tape adjacent to the rewind reel.

These and other features, capabilities and advantages of the invention will appear from the subjoined detail description of one specific embodiment thereof illustrated in the accompanying drawings in which Figure 1 is a front elevation partly broken away of a device equipped according to the present invention;

Fig. 2 is a side elevation partly broken away of the device illustrated in Fig. 1;

Figure 3:
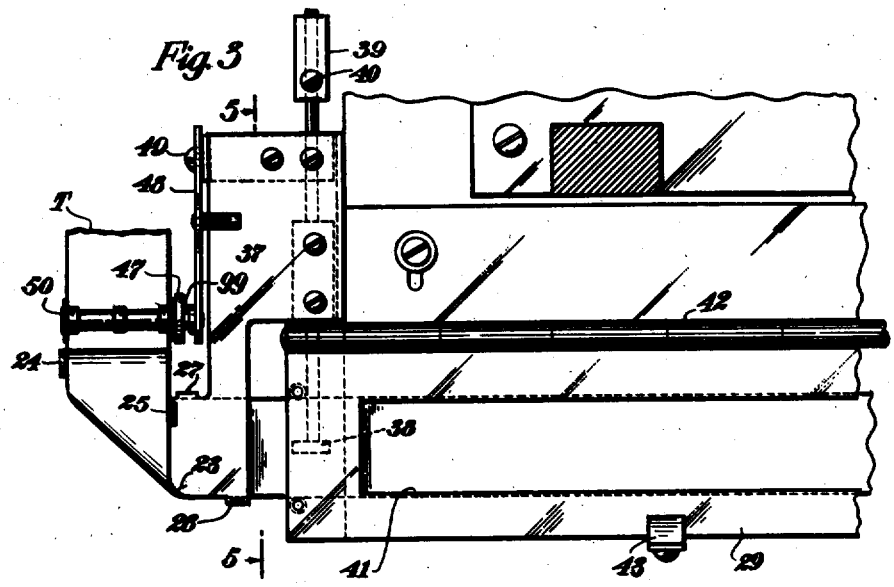
Fig. 3 is an enlarged fragmental detail of a portion of the tape controlling means.
Figure 4:
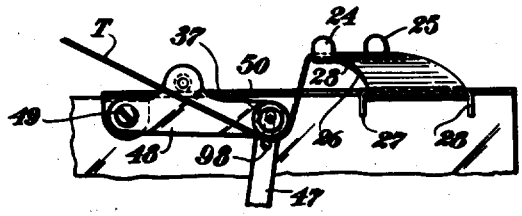
Fig. 4 is an end elevation of the portion illustrated in Fig. 3.
Figure 5:
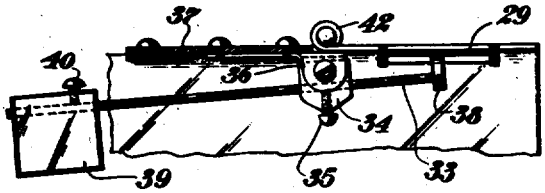
Fig. 5 is a section on the line 5—5 of Fig. 3.
Figure 6:
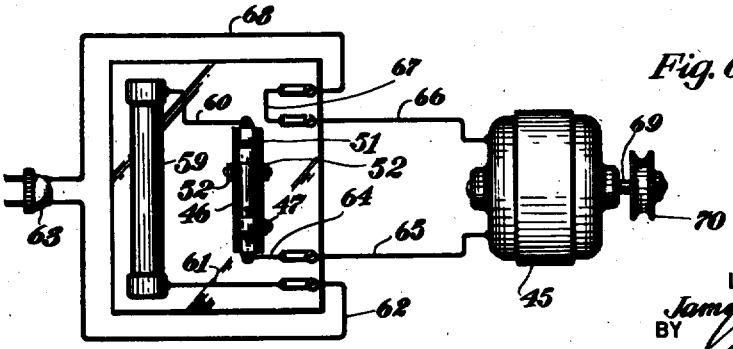
Fig. 6 is a diagrammatic view showing the wiring for the motor and controlling switch.

In the embodiment shown in Figs. 1 and 2, there is provided a frame 1 having a lower platform 2 and an upper platform 3. On the platform 3 there is supported the lamp housing 4 containing the lamp 5 and lens 6 through which the rays from the lamp 5 pass to the inclined mirror 7 and by which mirror 7 the light rays are deflected upward through a light aperture across which the tape T passes.

The tape T is preferably composed of a transparent material or a translucent material so that light may readily pass through such tape and project images of the characters on the tape to the projecting lens formed in the housing 8 from which the images are projected onto the mirror 9 in the frame 10 and deflected by such mirror 9 onto the vertical screen 11. The frame 10, supporting the mirror 9 and screen 11, may be supported above the projecting mechanism in any usual way. In the present instance, the brackets 12 are provided which are secured to the wall 13 on which the frame 10 rests.

On the platform 3 adjacent to the lamp housing 4, there is also provided a supporting member 14 for supporting the ticker generally denoted by the reference character 15, which is provided with the feeding means consisting of the feed rollers 16 and 17 which cooperate with the printing wheel 18 in the usual way. The tape T passes from the supply reel 19, see Fig. 1, to the feeding means 16, 17, and then past the printing means 18. The reel 19 is supported on the shaft 20 extending from the bracket 21 which is connected to the supporting frame 14. From the printing mechanism 18, the tape passes over the finger 22 to the angle plate 23 which has guiding projections 24, 25, extending upwardly, between which the tape passes to the curved portion 26 and then between the downwardly extending guiding projections 27, 28 to and along the lower face of the frame 29 to the idler 30, and over the idler 30 down to the feed roller 31 beneath the platform 3 to the rewind reel 32.

In order to dissipate the vibrations transmitted to the tape T by the ticker 15 due to the intermittent feeding action of the feed means 16, 17, and printing mechanism 18, there is provided a friction creating device, known in the projecting machine trade as an ironing out device which consists of the lever 33 extending through the yoke 34 and adjustably connected thereto by the screw 35. This yoke 34 is pivotally connected to the bracket 36 which is secured to the lower face of the plate 37 extending from the upper end of the lamp housing 4 adjacent to the ticker 15.

One end of the lever 33 is preferably provided with a tape engaging device 38, and the other end extends through a weight 39 which is connected to the lever 33 preferably by means of a screw 40. By means of the screws 35 and 40, both the length of the arms of the lever 33 may be adjusted and the position of the weight 39 adjusted in order to obtain the degree of pressure desired on the tape T. The tape engaging device 38, as shown in Fig. 3, preferably engages the tape T to press it against the lower face of the frame 29 before the tape passes to the light aperture 41 in the frame 29.

The frame 29, as shown in Fig. 3, is provided with the light aperture 41, the tape passing across such light aperture 41 to permit the light rays deflected by the mirror 7 to pass through the tape to the projecting lens in the housing 8. The frame 29, as shown in Fig. 3, is preferably hinged at 42 to the top of the angle box and is adapted to fold down over the path of movement of the tape T to be engaged by the projection 43 formed at the upper end of the arm 44 secured to the front face of the angle box, see Figs. 1 and 2.

On the platform 2 there is supported the motor 45 which is operatively connected to actuate the drawing roller 31 and the rewind reel 32. The tape pulling roller 31 and rewind reel 32 are adapted to be stopped and started according to the operation of the ticker 15. In order so to control the operation of the tape pulling roller 31 and rewind reel 32, the motor 45 is operatively connected to a mercury switch 46 which in turn is operatively connected by means of the connecting link 47 with the lever 48 which is pivotally connected at 49 to the side of the angle box adjacent to the ticker 15. The lever 48 is preferably provided with a tape engaging sheave 50 which rests on the upper surface of the tape T to deflect the tape T to form a loop or bend before the tape T engages the bent plate 23. The mercury switch 46 is supported on a plate 51 which is pivotally mounted on the projections 52, 52.

The connecting link 47 has an extended slot 53 at its lower end through which extends the pin 54 on the plate 51 and a slot 98 to receive the pin 99 of the lever 48. The pin 54 is so positioned relative to the pivotal connection of the plate 51 with the projections 52, 52, that the center of gravity of the plate 51 with its appurtenant parts is disposed between the projections 52 and the pin 54 so that the plate 51 will, due, to gravity, tend to exercise a downward pull on the connecting link 47 when the end of the plate containing the pin 54 is raised by the connecting link 47. The center of gravity of the plate 51 relative to the projections 52, 52, is also such that when the link 47 does not exercise an upward pull on the plate 51, the end of the plate containing the pin 54 will descend to its lowest point determined by the face 55 of the member 56.

The mercury in the tube 57 of the mercury switch 46 relative to its contacts is so disposed that the contact will be broken when the end 58 of the tube 57 is raised and that contact will be made when the end 58 is lowered. The mercury switch 46 is connected to the resistance 59 by means of the conductor 60, which resistance 59 by means of the conductor 61 is connected to the main lead 62 leading to the outlet plug 63. The other end of the switch 46 is connected by the conductor 64 to the conductor 65 of the motor 45. The other pole of the motor 45 is connected by the conductor 66 to the conductor 67 by means of which it is connected to the other main lead 68 of the outlet plug 63.

The motor 45 is provided with a shaft 69 on which is mounted the sheave 70 which is connected by means of the belt 71 to the sheave 72 on the shaft 73, which is provided with a worm 74 in mesh with the worm wheel 75, which worm wheel 75 is mounted on the shaft 76, which shaft 76 has mounted thereon the sheaves 77 and 78. The sheave 77 is connected by means of the belt 79 to the sheave 80 on the shaft 81 journaled in the upper end of the bracket 82. On the shaft 81 is mounted the tape pulling roller 31. In order to frictionally engage the tape T with the tape pulling roller 31, the idler 83 is journaled in the upper end of the arm 84 which is pivotally connected at 85 to the bracket 82, which arm 84 has an extension 86 to receive an adjustable weight 87 whereby the pressure on the tape T or frictional engagement between the idler 83 and the tape pulling roller 31 can be properly adjusted.

The sheave 78 is connected by the spring belt 88 with the sheave 89 on the shaft 90, on which shaft 90 is mounted the reel 32.

From the foregoing, it will appear that when the ticker 15 is operating to form sufficient slack to permit the sheave 50 to depress the tape T low enough to permit the connecting link 47 in turn to permit the end 58 of the mercury switch 46 to be depressed, contact will be made to permit the motor 45 to be actuated in turn to actuate the tape pulling roller 31 and reel 32. It will also appear that as soon as the ticker 15 pauses sufficiently long to permit the tape pulling roller 31 to cooperate with the ticker 15 to dissipate the slack in the tape T and thereby raise the lever 48, in turn to raise the connecting link 47, the end 58 of the switch 46 will be raised to break contact and thereby cause the motor 45 to be stopped.

In a period of five minutes the ticker 15 may be started and stopped a number of times, and as a result thereof the motor stopped and started a number of times. In order to protect the motor 45 from being overheated by the constant stopping and starting of the same, the resistance 59 will function to diminish the amperage sufficient to prevent such overheating.

It will also appear from the foregoing that due to the slot 53 at the lower end of the connecting link 47, the motor 45 can by no possible chance be stopped simultaneously with the stopping of the ticker 15, but, on the other hand, always a little after the ticker 15 has stopped and thus protect the tape from the jar to which it would be subjected if it were suddenly stopped, especially if the ticker 15 and motor 45 were stopped at the very same instant.

This elongated slot 53 is also of value when starting the motor 45. Here, before the full slack will have been formed in the tape T, the link 47 will have permitted the end 58 of the switch 46 to be lowered to make contact and start the motor 45. Since the motor 45 will not acquire its full momentum until after it has made a number of revolutions, during the period that further slack is being formed in the tape T, that is while the connecting link 47 drops its fullest extent afforded by the length of the slot 53, sufficient time will have elapsed to permit the motor to acquire its full operating momentum. In this way, the slack in the tape T can never mount up, it being assumed, of course, that the speed of the motor 45 will be timed to synchronize substantially with the rate of feed provided by the feeding means 16, 17.

The spring belt 88 is provided in order to compensate for the gradually increasing drawing action transmitted to the tape T by the gradually increasing diameter of the rewind reel. It will be noted that the uniform feeding roller 31, constituting the tape drawing roller, is interposed between the projecting mechanism and the rewind reel 32 so that the uneven drawing action, or gradually increasing drawing action, of the rewind reel 32, will not be transmitted to the tape T.

Figure 7:
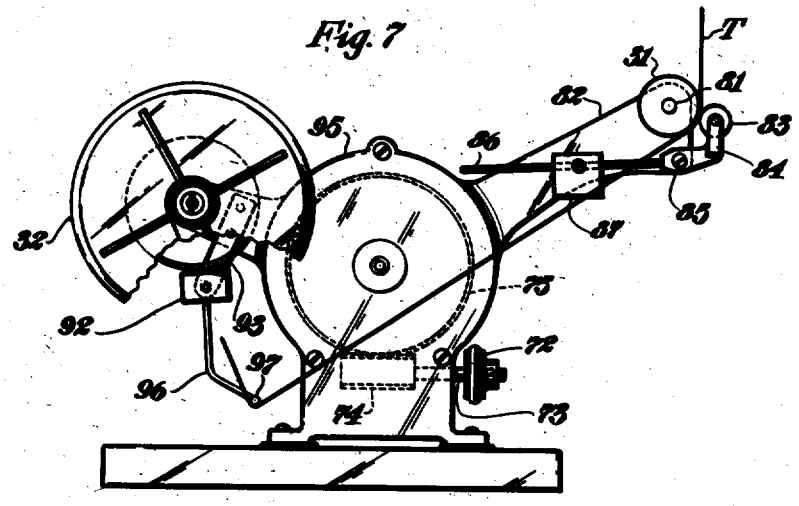
Fig. 7 is a side elevation of the rewind mechanism.
Figure 8:
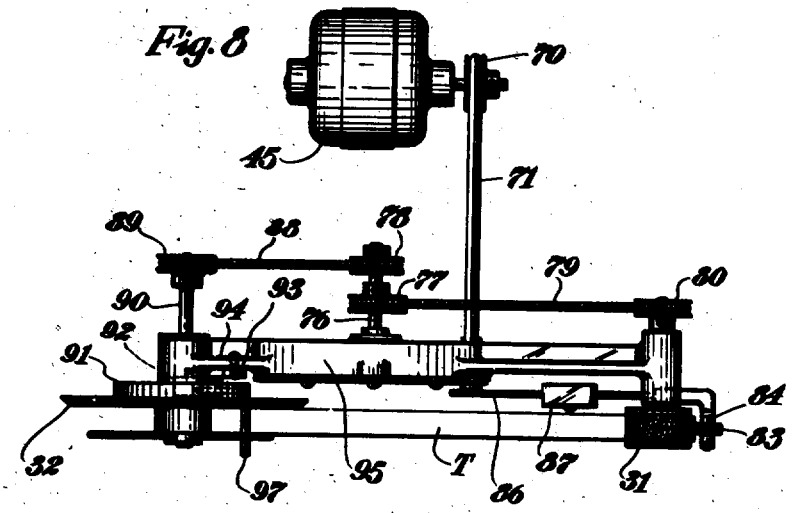
Fig. 8 is a plan of the rewind mechanism shown in Fig. 7.

In some instances, it may be desirable to dispense with the electric make and break and to diminish the frictional engagement between the idler 83 and the roller 31 sufficient to permit slippage when the ticker 15 is stopped, without stopping the motor 45. In such case, however, it is desirable also to diminish the drawing tension produced by the rewind reel 32. This is very effectively done by providing a brake to anchor the rewind reel 32 against rotation, at least sufficient to permit the spring belt 88 to slip relative to the sheave 89. To this end, the reel 32 is provided with a braking drum 91 to be engaged by a brake shoe 92, which is pivotally mounted on the arm 93 extending from the bracket 94 of the housing 95 of the worm wheel 75. The brake shoe 92 is provided with an arm 96 having a finger 97 to engage the tape T, as indicated in Fig. 7. In this instance, when the ticker 15 stops and the rewind reel 32 continues to wind up the tape T, it will take up the slack in the tape T between the tape pulling roller 31 and the rewind reel 32 to raise the finger 97 and thereby cause the brake shoe 92 to be wedged against the braking hub 91.

It is obvious that various changes and modifications may be made to the details of construction and in the steps of the method without departing from the general spirit of the invention as set forth in the appended claims.

I claim:

1. The combination with a ticker tape, of a ticker having a printing mechanism for printing positive type impressions on said ticker tape and having a feeding mechanism for imparting a feeding impulse to said tape after a printing impression, a projecting mechanism having a horizontally disposed light aperture, a right angularly bent guide for twisting the tape through a right angular path of movement for inverting the tape and guiding the tape so inverted over said light aperture, a projecting lens above said light aperture for receiving images of the configurations on said tape, a deflector above said lens for receiving images from said lens, and a screen above said lens for receiving images from said deflector.

2. The combination with a ticker tape, of a ticker having a printing mechanism for printing configurations on said tape and having a feeding mechanism for discharging said tape in one direction, a projecting mechanism having a horizontally disposed light aperture, an angular guide for twisting the tape at an angle to the direction of discharge from said ticker and inverting the tape to pass while inverted over said light aperture, deflecting means above said light aperture, a lens above said light aperture for receiving images from said tape and projecting them to said deflecting means, and a screen, said deflecting means deflecting the images received to said screen.

3. The combination with a ticker tape, of a ticker having a printing mechanism for printing configurations on said tape and having a feeding mechanism for imparting a feeding impulse to said tape, a lamp housing to one side of said ticker and having a horizontally disposed light aperture, a lamp in said housing to the rear of said light aperture, a lower deflector in said lamp housing for receiving the light rays from said lamp and deflecting them upwardly through said light aperture, guides for guiding the tape from said ticker over said light aperture, a screen above and forwardly of said light aperture, an upper deflector above said light aperture and to the rear of said screen, and projecting means for receiving images from the tape located across said light aperture and projecting them onto said upper deflector to deflect them forwardly onto said screen.

4. The combination with a ticker tape, of a ticker having a printing mechanism for printing positive type characters on said tape and having a feeding mechanism for imparting a feeding impulse to said tape, a projecting mechanism having a horizontally disposed light aperture, a guide disposed between said ticker and said light aperture conformed to invert the tape and pass it over said light aperture, the tape passing in part under said guide when being inverted, and a finger for pressing the part of the tape passing under the guide upward against said guide to dissipate the vibrations transmitted thereto by said ticker.

5. The combination with a ticker tape, of a ticker having a printing mechanism for printing positive type characters on said tape and having a feeding mechanism for imparting a feeding impulse to said tape, a projecting mechanism having a horizontally disposed light aperture, a guide disposed between said ticker and said light aperture conformed to invert the tape and pass it over said light aperture, part of the tape passing under the guide when so inverted, a finger pivotally connected to said projecting mechanism, and a weight connected to one end of said finger to cause the other end of said finger to press the part of the tape passing under the guide upward against said guide to dissipate the vibrations transmitted to the tape by said ticker.

6. The combination with a ticker tape, of a ticker having a printing mechanism for printing positive type characters on said tape and having a feeding mechanism for imparting a feeding impulse to said tape, a projecting mechanism having a horizontally disposed light aperture, a guide disposed between said ticker and said light aperture conformed to invert the tape and pass it over said light aperture, a bracket pivotally connected to said projecting mechanism, a finger adjustably connected to said bracket, and a weight adjustably connected to one end of said finger and causing the other end of said finger to press the tape into engagement with said guide to dissipate the jump transmitted thereto by said ticker.

7. The combination with a ticker tape, of a ticker having a printing mechanism for printing on said tape and a feeding mechanism for imparting a feeding impulse to said tape, a projecting mechanism, a drawing means cooperating with said feeding mechanism to draw the tape through said projecting mechanism, an electric motor for driving said drawing means, a pivotally mounted mercury switch for controlling said electric motor, a lever having its free end resting on said tape, and a link connecting said lever with said mercury switch, said lever being actuated by said tape when said feeding mechanism comes to rest in turn through said link to actuate said mercury switch to shut off the current to said motor.

8. The combination with a ticker tape, of a ticker having a printing mechanism for printing on said tape and having a feeding mechanism for imparting a feeding impulse to said tape after printing, a projecting mechanism, a drawing mechanism cooperating with the feeding mechanism to pass the tape through said projecting mechanism, a lever having its free end adapted to rest on said tape and be raised when said tape becomes taut, an electric motor, a pivotally mounted mercury switch for controlling said motor, and a link connected to said lever and having a pin and slot connection with said mercury switch, said lever when actuated into raised position in turn actuating said mercury switch to shut off the current to said motor and being free to descend when said feeding mechanism operates to form slack in said tape in turn to actuate said mercury switch to make contact and thereby cause the motor to operate.

9. The combination with a ticker tape, of a ticker having a printing mechanism for printing on said tape and having a feeding mechanism for imparting a feeding impulse to said tape after printing, a projecting mechanism, a drawing mechanism cooperating with the feeding mechanism to pass the tape through said projecting mechanism, a lever having its free end adapted to rest on said tape and be raised when said tape becomes taut, an electric motor, a pivotally mounted mercury switch for controlling said motor, and a link having a pin and slot connection with said lever and having a pin and slot connection with said mercury switch, said lever when actuated into raised position in turn actuating said mercury switch to shut off the current to said motor and being free to descend when said feeding mechanism operates to form slack in said tape in turn to actuate said mercury switch to make contact and thereby cause the motor to operate.

10. The combination with a ticker tape, of a ticker having a printing mechanism for printing on said tape and having a feeding mechanism for imparting a feeding impulse to said tape, a projecting mechanism, a tape drawing roller, a rewind reel, a motor, a belt connecting said drawing roller with said motor, and a belt connecting said rewind reel with said motor, said drawing roller cooperating with said feeding mechanism to pass the tape through said projecting mechanism, said rewind reel receiving the tape from said drawing roller, said drawing roller and rewind reel being free to slip relative to one another and to said motor.

11. The combination with a ticker tape, of a projecting mechanism, a ticker having a printing mechanism for printing on said tape and having a feeding mechanism for feeding said tape to said projecting mechanism, a drawing roller, a rewind reel, a motor, a spring belt connecting said drawing roller with said motor, a spring belt connecting said rewind reel with said motor, a brake drum on said rewind reel, and a pivotally mounted lever having a brake shoe at one end to cooperate with said brake drum and a finger at the other end to cooperate with said tape, said drawing roller receiving the tape from said projecting mechanism, said rewind reel receiving the tape from said drawing roller, said rewind reel cooperating with said feeding mechanism to take up the slack in said tape when said feeding mechanism comes to rest thereby actuating said finger in turn to wedge said brake shoe in engagement with said brake drum to arrest said rewind reel.

12. The combination with a ticker tape having news items printed thereon facing upwardly, of a projecting mechanism having a horizontally disposed light aperture, a right angular guide for inverting the tape, tape drawing means for drawing said tape across said light aperture while so inverted, a projecting lens disposed above said tape to receive images of the configurations on said tape, a deflector above said projecting lens to receive the images from said lens, and a screen for receiving the images from said deflector.

13. The combination with a ticker tape having news tiems formed thereon facing upwardly, of a projecting mechanism having a horizontally disposed light aperture, an inverting guide for inverting and guiding the tape to cross said light aperture while so inverted, a projecting lens disposed above said tape to receive images of the configurations on said tape, a deflector above said projecting lens to receive the images from said lens, and a screen for receiving the images from said deflector.

14. The combination with a ticker tape having positive type impressions formed thereon facing upwardly, of a projecting mecnanism having a horizontally disposed light aperture, a right angularly bent guide for inverting the tape and guiding the tape inverted toward said light aperture, a projecting lens above said light aperture for receiving images of the downwardly facing configurations on said tape, a deflector above said lens for receiving images from said lens, and a screen above said lens for receiving images from said deflector.

15. The combination with a ticker tape having configurations formed thereon, of a projecting mechanism having a horizontally disposed light aperture, an angular guide for inverting the tape at an angle to its original path of movement to cross said light aperture while inverted, deflecting means above said light aperture, a lens above said light aperture for receiving images from said tape and projecting them to said deflecting means, and a screen, said deflecting means deflecting the images received to said screen.

16. The combination with a ticker tape having configurations formed thereon facing upwardly, of a lamp housing having a horizontally disposed light aperture, a lamp in said housing to one side of said light aperture, a deflector in said lamp housing for receiving the light rays from said lamp and deflecting them upwardly through said light aperture, an inverting guide for inverting and guiding the tape to cross said light aperture while so inverted, a screen, and projecting means above said tape for receiving images from the tape while so inverted on said light aperture and projecting them onto said screen.

17. In a projection system wherein a character-bearing tape passes flatwise from ticker mechanism and with one surface facing upwardly, the method which comprises supporting said tape for horizontal movement through a projection field with said one surface facing downwardly, and controlling movement of said tape through said projection field in response to change in configuration of a tape loop disposed at the entrance to said projection field.

18. In a projection system wherein a character bearing tape passes flatwise from ticker mechanism and with one surface facing upwardly, the method which comprises supporting said tape for horizontal movement through a projection field with said one surface facing downwardly, and controlling movement of said tape through said projection field in response to deflections in the tape disposed at the entrance to said projection field.

19. The combination with a projection field, of a ticker tape having one surface facing upwardly when it is discharged from a ticker, an axial bend in the ticker tape at the entrance to said projection field, said one surface of said tape facing downwardly beyond said bend and when the tape passes through said projection field, a tape puller for pulling said tape horizontally through said projection field, and a control for said tape puller responsive to deflections in the tape before passing to said projection field.

20. The combination with a ticker tape, of a projection field, a ticker having a ticker mechanism for printing on said tape and having a feeding mechanism for feeding said tape to said projection field, a tape puller for pulling the tape through said projection field including a take-up reel, a brake drum associated with said take-up reel, a pivotally mounted lever having a brake shoe at one end to cooperate with said brake drum, and a finger at the other end to cooperate with said tape, said rewind reel cooperating with said feeding mechanism to take up the slack in said tape when said feeding mechanism comes to rest thereby actuating said finger in turn to wedge said brake shoe into engagement with said brake drum to arrest said rewind reel.

JAMES W. DECKER.